United States Patent
Brealey et al.

(10) Patent No.: US 10,503,479 B2
(45) Date of Patent: Dec. 10, 2019

(54) SYSTEM FOR MODELING TOOLCHAINS-BASED SOURCE REPOSITORY ANALYSIS

(71) Applicant: International Business Machines Corporation, Armonk, NY (US)

(72) Inventors: Christopher Brealey, Markham (CA); Christopher Taylor, Newmarket (CA); Joel Cayne, Ontario (CA); Philippe Mulet, Saint-Nazaire (FR); Ritchard L. Schacher, Cary, NC (US); Thomas C. Schmidt, North York (CA)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/972,661

(22) Filed: May 7, 2018

(65) Prior Publication Data

US 2019/0339945 A1 Nov. 7, 2019

(51) Int. Cl.
*G06F 9/44* (2018.01)
*G06F 8/10* (2018.01)

(52) U.S. Cl.
CPC .................... *G06F 8/10* (2013.01)

(58) Field of Classification Search
CPC ....................................................... G06F 8/10
USPC ....................................................... 717/104
See application file for complete search history.

(56) References Cited

U.S. PATENT DOCUMENTS

| 7,627,861 B2 | 12/2009 | Smith et al. | |
| 2003/0101334 A1* | 5/2003 | Desoli | G06F 9/4484 712/227 |
| 2005/0166193 A1* | 7/2005 | Smith | G06F 8/75 717/143 |
| 2008/0201330 A1 | 8/2008 | Bloesch | |
| 2009/0228862 A1* | 9/2009 | Bertelrud | G06F 8/20 717/100 |

FOREIGN PATENT DOCUMENTS

WO 2016099535 A1 6/2016

OTHER PUBLICATIONS

David Skoglund, "A Standardized Approach to Tool Integration", Nov. 2012, pp. 1-44 (Year: 2012).*
Weiqing Zhang et al., Establishing Tool Chains above the Service Cloud with Integration Models, 2013, pp. 372-379 (Year: 2013).*
Matthias Biehl et al., "On the modeling and generation of service-oriented tool chains", 2012, pp. 461-480 (Year: 2012).*
Korinth et al. "ThreadPoolComposer—An Open-Source FPGA Toolchain for Software Developers", 2nd International Workshop onFPGAs for Software Programmers; Sep. 2015.
Bridges et al. "Create and use your first toolchain", retrieved from https://www.ibm.com/cloud/garage/tutorials/introduce-develop-cloud-foundry-app-toolchain/; as early as Nov. 2017.
(Continued)

*Primary Examiner* — Wei Y Zhen
*Assistant Examiner* — Lanny N Ung
(74) *Attorney, Agent, or Firm* — Brown & Michaels, PC; Scott Dobson

(57) ABSTRACT

Examining source code repositories for indications of orthogonal technologies in actual use or of potential usefulness in the development and continuous delivery of the contents of the repositories.

12 Claims, 4 Drawing Sheets

(56) References Cited

OTHER PUBLICATIONS

"Buildpack Detection", retrieved from https://docs.cloudfoundry.org/buildpacks/understand-buildpacks.html#buildpack-detection; Oct. 2011.
Chesta et al. "A Toolchain for Delta-Oriented Modeling of Software Product Lines", ISoLA 2016, Part II, LNCS 9953, pp. 497-511, 2016.
"Language Savant", retrieved from https://github.com/github/linguist; as early as Nov. 2013.

* cited by examiner

SYSTEM FOR MODELING TOOLCHAINS-BASED SOURCE REPOSITORY ANALYSIS

BACKGROUND

The present invention relates to computer coding methods, and more specifically to methods of organizing and retrieving software tool configurations from analysis of software repositories.

With the rapid emergence of cloud and mobile computing, the processes and mechanisms through which software is developed and deployed have seen dramatic transformations. The competitive pressure on businesses today is tremendous, and enterprises are quickly transforming their culture and practices to an agile, continuous delivery, DevOps-oriented approach to development. Along with culture and practices, a key component of enabling continuous delivery is the set of tools that engineers use for all aspects of the development lifecycle, including design, coding, deployment, testing, management, monitoring, and data analysis. This set of tools is often referred to as a "toolchain".

With the proliferation of tools and a virtually infinite combination of tools that a team can implement to compose a toolchain, as well as the need for automation as part of a DevOps story for enabling innovation and quick bootstrapping of new projects, systems are needed and being developed for automated provisioning and configuration of tools in a toolchain. These systems can provide additional value beyond provisioning, to allow rich integrations and messaging between the tools. For example, notifications to a persistent chat channel are posted as a result of tooling events, such as code commits in a repository tool, build results and failures in a continuous integration tool, etc. Many such pair-wise integrations between tools exist in the industry today.

The task of discovering, researching, selecting, procuring, installing, and configuring tools appropriate to a given software development project can be complex and time consuming, as can be the work to "on board" new developers to an existing project with an established toolchain. In the formative phase of a software project, a team may begin by provisioning a toolchain from an existing "toolchain template" that at least approximates the anticipated needs of the project—the programming languages and run-times to be employed, the test frameworks and techniques of importance, the manners in which the project members will collaborate, and so forth. With the toolchain so provisioned, the team can begin development and continuous delivery proper.

However, in many cases the software project already exists in the form of source code in repositories. Repositories are used to contain code, build scripts, test suites, manifests, and other files constituting some or all of the assets of a software project, as well as a history of changes and contributions to those assets. Repositories as presently implemented imply, at best, ad-hoc, and at worst no agreed-to portfolio of tools.

The aforementioned complexity and tedium of assembling a best-of-breed toolchain is exacerbated by having to investigate the source code repositories as critical input into researching the broad canvas of possible tools and ultimately choosing tools that will support the project and integrate well with each other. In short, assembling an effective toolchain from existing source code collateral can be a massive undertaking.

Indicators are patterns of data in the files or history of collection of source code and other software artifacts such as in a file system, archive or repository that suggest the actual or potential use of a technology (tool). For example, JavaScript that requires 'wd' or 'selenium-webdriver' indicates the use of Selenium® software from Software Freedom Conservancy, Inc. of Brooklyn, N.Y., and the potential use of the Sauce Labs® system from Sauce Labs Inc. of San Francisco, Calif., for software testing.

GitHub®, a software package from GitHub Inc. of San Francisco, Calif., is software for program development and editing which uses Linguist to examine repositories and determine the source language. This information is then used to control built-in editor behavior. Linguist does not characterize other non-language repository contents, such as indications of test frameworks used.

Cloud Foundry®, from Cloud Foundry.org Foundation, Inc. of San Francisco, Calif., is a software package for deploying and managing applications. A Cloud Foundry buildpack includes a "detect" script that examines the files of an application to determine if the application is meaningful to the buildpack or not. This is used to select a run-time for the application in isolation of any other applications. It does not examine other contents in the repository, such as test frameworks.

SUMMARY

According to one embodiment of the present invention, a computer implemented method for modeling toolchains, to be instantiated, in an environment is disclosed. The environment comprising a toolchain fabric that manages a catalog of a plurality of tool brokers, each tool broker defining an object that represents a specific type of tool, and provisions and configures tool integrations, each tool integration defining an object that represents a distinct instance of usage of a corresponding tool, and produces toolchains of tool integrations, each toolchain comprising a set of tool integrations and relationships between respective tool integrations. The computer implemented method comprising: a computer engine receiving an identification of at least one repository from a user, a set of classifiers, and a catalog of the toolchain fabric comprising known, categorized tool brokers; the computer engine identifying indicators of technologies in the at least one repository using at least one selected classifier from the set of classifiers; the computer engine classifying, using an ontology, contents of the at least one repository according to the indicators of technologies identified; the computer engine analyzing the catalog of the plurality of tool brokers, to identify a set of tools; the computer engine generating a toolchain model comprising a mapping between the at least one repository and the plurality of tool brokers based upon an intersection of indicated technologies identified in the at least one repository and technologies supported by the set of tools identified, wherein a tool broker in the plurality of tool brokers supports a technology when a classification of the tool broker is equal to or more specific than a classification of a technology; the computer engine generating a toolchain model that specifies a configuration of tools in number and type for use with the set of repositories, wherein a given tool integration is governed by a tool broker in the plurality of tool brokers, and wherein a subset of the tool integrations represent an original set of repositories or clones thereof; and the computer engine serializing the toolchain model into a toolchain template.

According to an embodiment of the present invention a computer program product for modeling toolchains in an environment by a computer is disclosed. The computer comprising at least one processor, one or more memories, one or more computer readable storage media, the computer program product comprising a computer readable storage medium having program instructions embodied therewith. The environment comprising a toolchain fabric that manages a catalog of a plurality of tool brokers, each tool broker defining an object that represents a specific type of tool, and provisions and configures tool integrations, each tool integration defining an object that represents a distinct instance of usage of a corresponding tool and produces toolchains of tool integrations, each toolchain comprising a set of tool integrations and relationships between respective tool integrations. The program instructions comprising: receiving, by a computer engine, an identification of at least one repository from a user, a set of classifiers, and a catalog of the toolchain fabric comprising known, categorized tool brokers; identifying, by the computer engine, indicators of technologies in the at least one repository using at least one selected classifier from the set of classifiers; classifying, by the computer engine, using an ontology, contents of the at least one repository according to the indicators of technologies identified; analyzing, by the computer engine, the catalog of the plurality of tool brokers, to identify a set of tools; generating, by the computer engine, a toolchain model comprising a mapping between the at least one repository and the plurality of tool brokers based upon an intersection of indicated technologies identified in the at least one repository and technologies supported by the set of tools identified, wherein a tool broker in the plurality of tool brokers supports a technology when a classification of the tool broker is equal to or more specific than a classification of a technology; generating, by the computer engine, a toolchain model that specifies a configuration of tools in number and type for use with the set of repositories, wherein a given tool integration is governed by a tool broker in the plurality of tool brokers, and wherein a subset of the tool integrations represent an original set of repositories or clones thereof; and serializing, by the computer engine, the toolchain model into a toolchain template.

According to an embodiment of the present invention for a computer system for modeling toolchains in an environment is disclosed. The computer system comprising a computer comprising at least one processor, one or more memories, one or more computer readable storage media having program instructions executable by the computer to perform the program instructions. The environment comprising a toolchain fabric that manages a catalog of a plurality of tool brokers, each tool broker defining an object that represents a specific type of tool, and provisions and configures tool integrations, each tool integration defining an object that represents a distinct instance of usage of a corresponding tool and produces toolchains of tool integrations, each toolchain comprising a set of tool integrations and relationships between respective tool integrations. The program instructions comprising: receiving, by a computer engine, an identification of at least one repository from a user, a set of classifiers, and a catalog of the toolchain fabric comprising known, categorized tool brokers; identifying, by the computer engine, indicators of technologies in the at least one repository using at least one selected classifier from the set of classifiers; classifying, by the computer engine, using an ontology, contents of the at least one repository according to the indicators of technologies identified; analyzing, by the computer engine, the catalog of the plurality of tool brokers, to identify a set of tools; generating, by the computer engine, a toolchain model comprising a mapping between the at least one repository and the plurality of tool brokers based upon an intersection of indicated technologies identified in the at least one repository and technologies supported by the set of tools identified, wherein a tool broker in the plurality of tool brokers supports a technology when a classification of the tool broker is equal to or more specific than a classification of a technology; generating, by the computer engine, a toolchain model that specifies a configuration of tools in number and type for use with the set of repositories, wherein a given tool integration is governed by a tool broker in the plurality of tool brokers, and wherein a subset of the tool integrations represent an original set of repositories or clones thereof; and serializing, by the computer engine, the toolchain model into a toolchain template.

DETAILED DESCRIPTION

Figure 2:
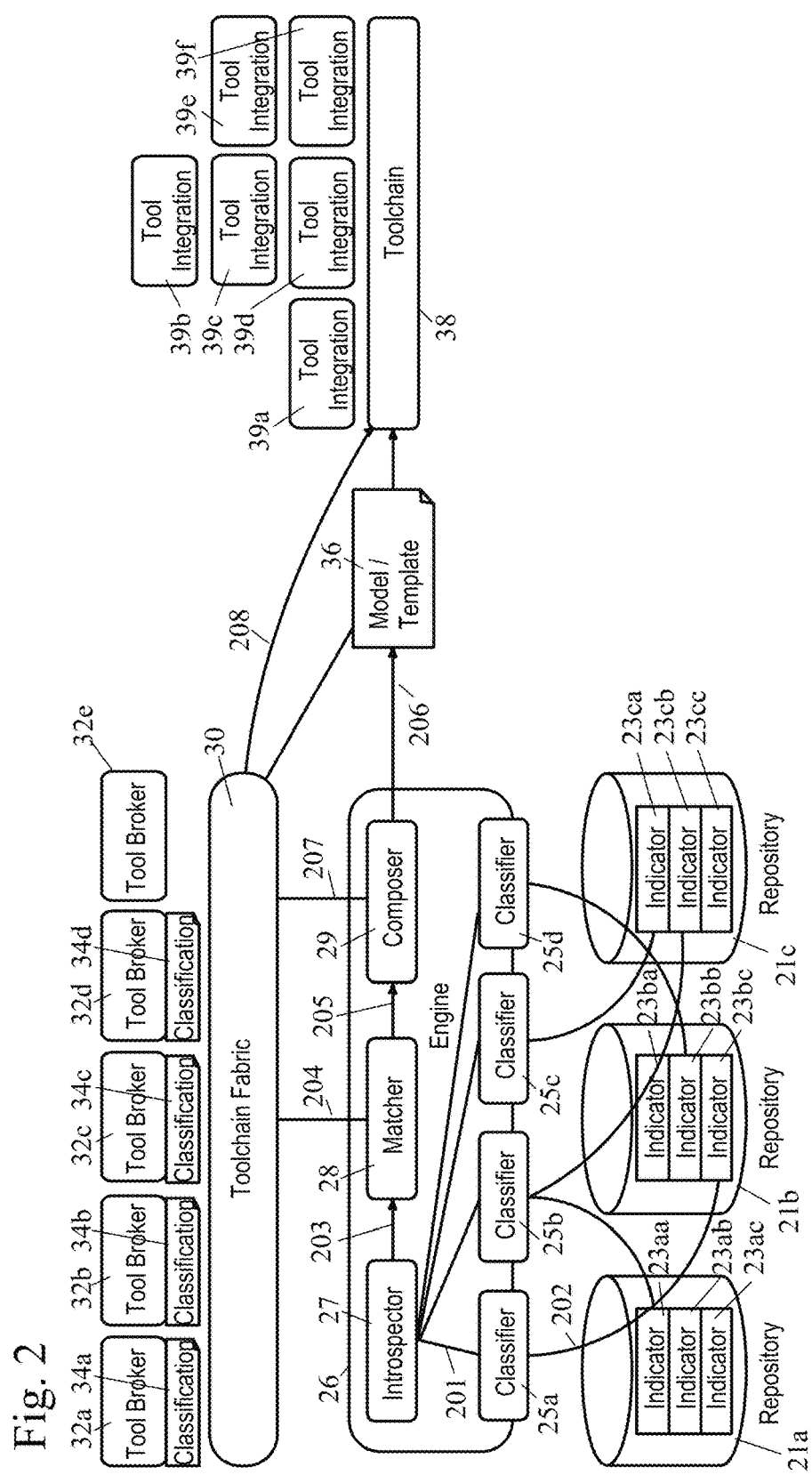
FIG. 2 shows a block diagram of the environment of the method.

FIG. 2 shows a block diagram of an environment for the implementation of the method.

A plurality of repositories $21a$-$21c$ each contain a plurality of indicators $23aa$-$23ac$ being in repository $21a$, $23ba$-$23bc$ in repository $21b$ and $23ca$-$23cc$ in repository $21c$. It will be understood that the representation in the figure is for exemplary purposes, and a real-world system may contain any number of repositories and indicators.

A toolchain fabric 30 is a system that manages a catalog of tool brokers $32a$-$32e$, which are objects that represent a specific type of tool, and that can provision and configure instances of the tool, and produces toolchain templates 36, and, optionally, toolchain instances 38 consisting of tool integrations $39a$-$39f$ each of which represents a distinct instance of usage of a tool, including the original repositories $21a$-$21c$ or clones thereof and the relationships between them.

A "template" is a serialization or representation of a model of tool integrations from which toolchain instances are generated by the toolchain fabric.

The tool brokers $32a$-$32e$ are enhanced with a means of associating one or more classifications $34a$-$34d$ with each of the tool brokers $32a$-$32e$. Classifications may be hierarchical, wherein one classification may be a specialization of another. Example: The "GitHub public" tool broker, which is a specialization of a "Git tool broker" and an "SCM tool broker", is classified as a (tool:repo:scm:git:github:public). It should be noted that the classifications are optional.

An engine 26 is a system that takes as input the plurality of repositories $21a$-$21c$ and a toolchain fabric 30 and outputs a model or template 36.

The engine 26 has a set of Classifiers $25a$-$25d$, which recognize indicators of technologies $23aa$-$23cc$ in repositories $21a$-$21c$ and classifies the contents of the repositories accordingly. A classifier accepts one or more repositories and produces zero or more classifications.

The engine 26 also has a matcher 28, which is a subsystem of the engine 26 that examines the catalog of tool brokers 32a-32e, and generates a mapping between a set of repositories 21a-21c and tool brokers 32a-32e based upon an intersection of technologies indicated by the repositories through the input provided by Introspector 27 and technologies supported by the tools using the classifications 34a-34d.

The Introspector 27, a subsystem of the engine 26, drives a plurality of pluggable classifiers 25a-25d which examine the source, artifacts and metadata of repositories 21a-21c to find indicators 23aa-23cc of technologies and to build a relation between repositories and technology classifications.

The engine 26 also has a composer 29, which is a sub-system of the engine 26 that takes the mapping from the matcher 28, and generates a toolchain model or template 36.

A toolchain fabric 30 provides a catalog of known, categorized tool brokers 32a-32e, and uses a toolchain model 36 that specifies a configuration of tools in number and type appropriate for use with the set of repositories 21a-21c, and produces a toolchain 38.

The templates 36 specify those tools that are applicable to the technologies indicated in the repositories 21a-21c and specify a configuration of tool integrations 39a-39f, where a given tool integration 39a-39f is governed by a tool broker 32a-32e, and may be related to none, some, or all of the repositories 21a-21c.

The flow of data in the system of FIG. 2 operates as follows:

201: The Introspector 27 drives a plurality of pluggable classifiers 25a-25d.

202: The classifiers 25a-25d examine the repositories 21a-21c to find indicators of specific kinds of source/artifacts/metadata. In the example of the figure, classifier 25a has identified indicator 23bc in repository 21b, classifier 25b has identified indicator 23aa in repository 21a and indicator 23cb in repository 21c, classifier 25c has identified indicator 23ca in repository 21c, and classifier 25d has identified indicator 23bb in repository 21b. The classifiers 25a-25d pass the found indicators 23aa-23cc back to the Introspector 27.

203: The Introspector 27 passes the resulting model of classified repositories 21a-21c to the matcher 28.

204: The matcher 28 consults the toolchain fabric 30 to locate candidate tool brokers 32a-32e which are relevant to each classification 34a-34d.

A tool broker 32a-32e is relevant to a technology if the classification 34a-34d of the tool broker is equal to or more specific than the classification of the technology. For example: Indications of Sauce Labs in a repository will not be matched by a more general test tool such as Selenium; whereas indications of Selenium in a repository will be matched by both Selenium and Sauce Labs test tools.

205: The matcher 28 passes the resulting model of repositories 21a-21c and applicable tool brokers 32a-32e to the composer 29.

206: The composer 29 derives a model of a pattern of tool integrations, tool configuration data, and tool-to-tool integration data, where a subset of the tool integrations represent the original repositories 21a-21c or clones thereof from the map of repositories and tool brokers 32a-32e created by the matcher 28. The model can be serialized to a template 36.

207: The composer 29 generates a template 36. The composer 29 constructs toolchain templates 36, which are patterns for toolchains 38.

208: The toolchain fabric 30 creates a toolchain instance 38 with tool integrations 39a-39f according to the template 36.

Figure 3:
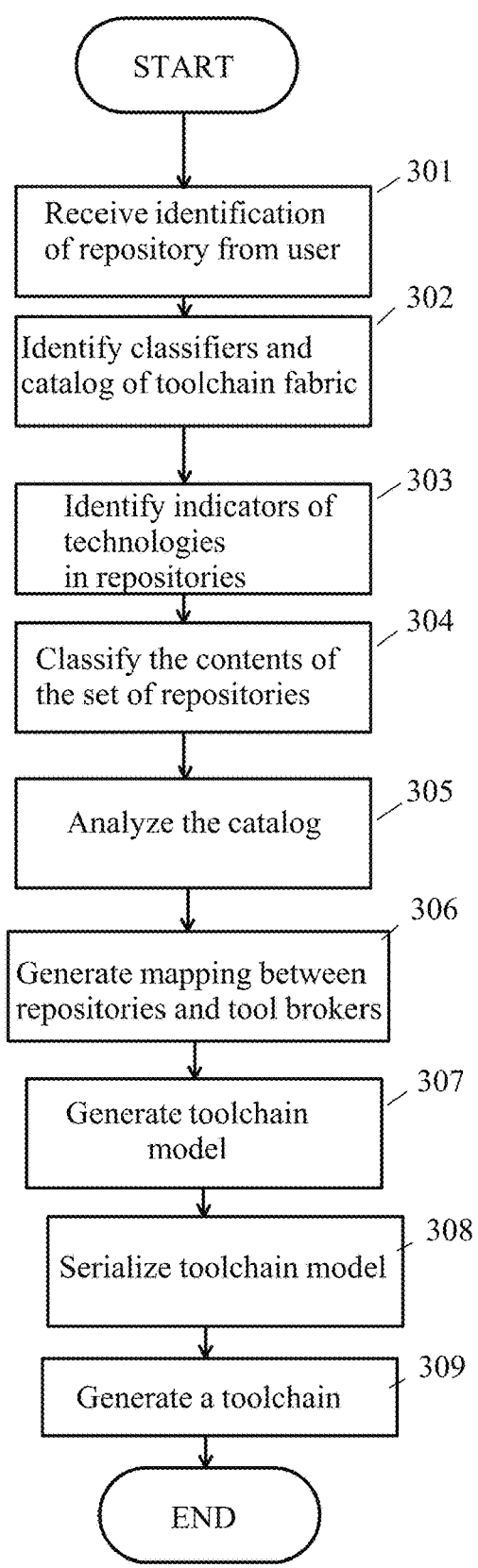
FIG. 3 shows a flowchart of the method.

FIG. 3 shows a flowchart of the method.

Step 301: Receiving an identification of at least one or more repositories from a user.

Step 302: Identifying a set of classifiers provided to the engine, and identifying a toolchain fabric with a catalog of known, categorized tool brokers.

Step 303: Identifying indicators of technologies in the set of repositories using each of the classifiers in a set of classifiers in the engine.

Step 304: Classifying the contents of the set of repositories according to the indicators of technologies identified.

Step 305: Analyzing the catalog of the plurality of categorized tool brokers to identify a set of tools.

Step 306: Generating a mapping between the set of repositories and the plurality of tool brokers based upon an intersection of technologies indicated in the set of repositories and technologies supported by the set of tools identified, wherein a tool broker in the plurality of tool brokers supports a technology when a classification of the tool broker is equal to or more specific than a classification of a technology.

Step 307: Generating a toolchain model that specifies a configuration of tools in number and type for use with the set of repositories, wherein a given tool integration is governed by a tool broker in the plurality of tool brokers, and wherein a subset of the tool integrations represent an original or cloned set of repositories.

Step 308: Serializing the toolchain model into a toolchain template.

Step 309: Generating a toolchain composed of integrations using the tools identified by the model or toolchain template and the method ends.

Example

Consider a single repository containing:
a. A package.json file
b. A Cloud Foundry manifest.yml
c. Application JavaScript source code (*.js files) d. Selenium JavaScript tests (*.js files that require the "wd" or "selenium-webdriver" packages)
e. A history of committer and pull request activity A user runs the method against the repository, and the method concludes with the generation of a toolchain template and a toolchain containing the identified tools.

The user examines the resulting template and toolchain and observes that it describes an arrangement of tools and tool configurations, including the original repository, or clone thereof, that reflects the majority of the tools the team uses, and possibly tools the team has not used but should consider:
a. 1×GitHub repository & issues
b. 1×Web IDE (e.g. online editor, source control repository, team communication service)
c. 1×Delivery Pipeline (with build, test, deploy stages), optimized and configured for deployments to Cloud Foundry (based on existence of Cloud Foundry manifest file)
d. 1×Sauce Labs (based on presence of Selenium test cases))
e. 1×Slack (based on multiple contributors to repository)

Figure 1:
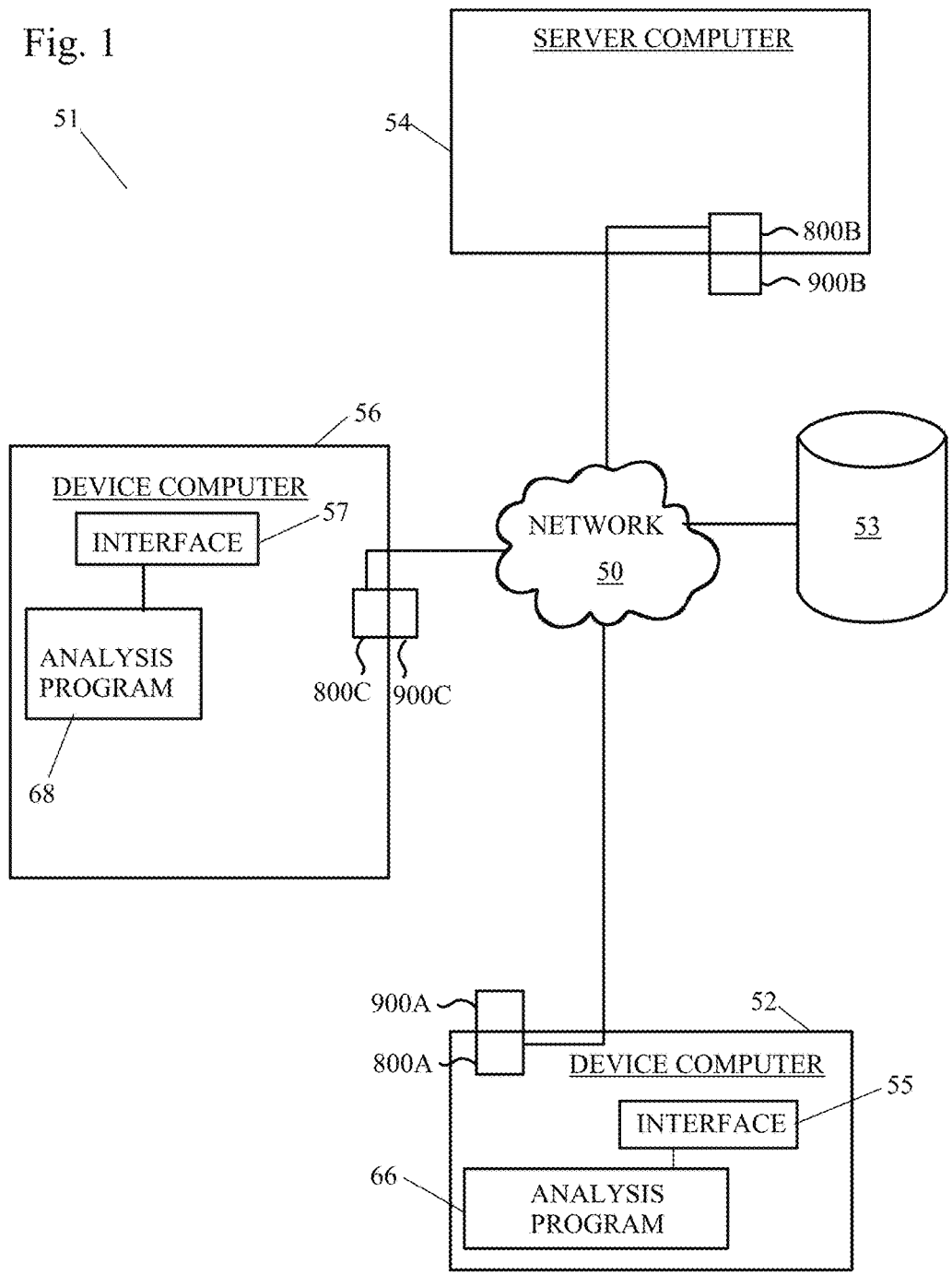
FIG. 1 depicts an exemplary diagram of a possible data processing environment in which illustrative embodiments may be implemented.
Figure 4:
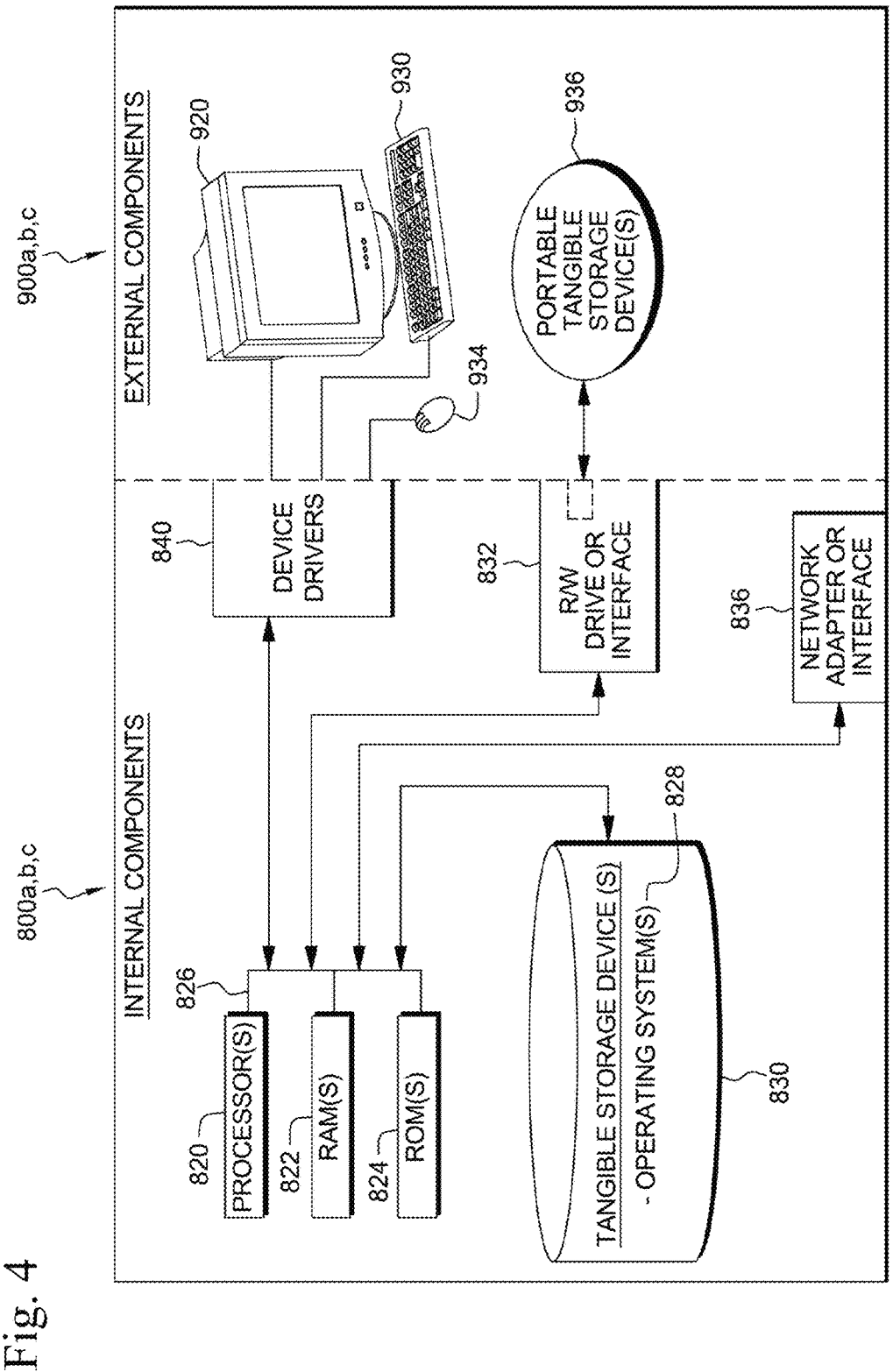
FIG. 4 illustrates internal and external components of a client computer and a server computer in which illustrative embodiments may be implemented.

FIG. 1 depicts an exemplary diagram of a possible data processing environment in which illustrative embodiments may be implemented. FIG. 4 illustrates internal and external components of a client computer and a server computer in which illustrative embodiments may be implemented.

It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computers 52 and 56, a repository 53, and a server computer 54 connect to network 50. In other exemplary embodiments, network data processing system 51 may include additional client or device computers, storage devices or repositories, server computers, and other devices not shown.

The device computers 52 and 56 may contain an interface 55 and 57, which may accept commands and data entry from a user. The commands may be regarding placing an order. The interface can be, for example, a command line interface, a graphical user interface (GUI), a natural user interface (NUI) or a touch user interface (TUI). The device computer 52 and 56 preferably include analysis program 66 and 68.

While not shown, it may be desirable to have the analysis program 66 be present on the server computer 54. The device computer 52 includes a set of internal components 800a and a set of external components 900a and the device computer 56 includes a set of internal components 800c and a set of external components 900c Server computer 54 includes a set of internal components 800b and a set of external components 900b. In the depicted example, server computer 54 provides information, such as boot files, operating system images, and applications to the device computer 52. Server computer 54 can compute the information locally or extract the information from other computers on network 50.

Program code and programs such as analysis program 66, 68 may be stored on one or more computer-readable tangible storage devices or on one or more portable computer-readable tangible storage devices, or may be downloaded to a device computers 52, 56 or server computer 54 as needed for use. For example, program code and programs such as analysis program 66, 68 may be stored on at least one of one or more storage devices on server computer 54 and downloaded to device computer 52, 56 over network 50 for use. Alternatively, server computer 54 can be a web server, and the program code, and programs such as analysis program 66, 68 may be stored on at least one of the one or more storage devices on server computer 54 and accessed by device computers 52, 56. In other exemplary embodiments, the program code, and programs such as analysis program 66, 68 may be stored on at least one of one or more computer-readable storage devices on device computers 52, 56 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 4 illustrates internal and external components of device computers 52, 56 and server computer 54 in which illustrative embodiments may be implemented. In FIG. 1, a device computer 52, 56 and a server computer 54 include respective sets of internal components 800a, 800b, 800c and external components 900a, 900b, 900c. Each of the sets of internal components 800a, 800b, 800c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and analysis program 66, 68 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b, 800c also includes a R/W drive or interface 832 to read from and write to one or more portable computer-readable tangible storage devices 936 such as a CD-ROM, DVD, memory stick, magnetic tape, magnetic disk, optical disk or semiconductor storage device. Analysis program 66, 68 can be stored on one or more of the portable computer-readable tangible storage devices 936, read via R/W drive or interface 832 and loaded into hard drive 830.

Each set of internal components 800a, 800b, 800c also includes a network adapter or interface 836 such as a TCP/IP adapter card. Analysis program 66, 68 can be downloaded to the device computers 52, 56 and server computer 54 from an external computer via a network (for example, the Internet, a local area network or other, wide area network) and network adapter or interface 836. From the network adapter or interface 836, analysis program 66, 68 is loaded into hard drive 830. Analysis program 66, 68 can be downloaded to the server computer 54 from an external computer via a network (for example, the Internet, a local area network or other, wide area network) and network adapter or interface 836. From the network adapter or interface 836, analysis program 66, 68 is loaded into hard drive 830. The network may comprise copper wires, optical fibers, wireless transmission, routers, firewalls, switches, gateway computers and/or edge servers.

Each of the sets of external components 900a, 900b, 900c includes a computer display monitor 920, a keyboard 930, and a computer mouse 934. Each of the sets of internal components 800a, 800b, 800c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Analysis program 66, 68 can be written in various programming languages including low-level, high-level, object-oriented or non object-oriented languages. Alternatively, the functions of analysis program 66, 68 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for modeling toolchains, in an environment comprising a toolchain fabric that manages a catalog of a plurality of tool brokers, each tool broker defining an object that represents a specific type of tool; provisions and configures tool integrations, each tool integration defining an object that represents a distinct instance of usage of a corresponding tool; and produces toolchains of tool integrations, each toolchain comprising a set of tool integrations and relationships between respective tool integrations, the computer implemented method comprising:
   a computer engine receiving an identification of at least one repository from a user, a set of classifiers, and a catalog of the toolchain fabric comprising known, categorized tool brokers;
   the computer engine identifying indicators of technologies in the at least one repository using at least one selected classifier from the set of classifiers;
   the computer engine classifying, using an ontology, contents of the at least one repository according to the indicators of technologies identified;
   the computer engine analyzing the catalog of the plurality of tool brokers, to identify a set of tools;
   the computer engine generating a toolchain model comprising a mapping between the at least one repository and the plurality of tool brokers based upon an intersection of indicated technologies identified in the at least one repository and technologies supported by the set of tools identified, wherein a tool broker in the plurality of tool brokers supports a technology when a classification of the tool broker is equal to or more specific than a classification of a technology;
   the computer engine updating the toolchain model to specify a configuration of tools in number and type for use with the set of repositories, wherein a given tool integration is governed by a tool broker in the plurality of tool brokers, and wherein a subset of the tool integrations represent an original set of repositories or clones thereof; and
   the computer engine serializing the toolchain model into a toolchain template.

2. The method of claim 1, further comprising the step of generating a toolchain having at least one toolchain instance, using the tools identified by the toolchain template.

3. The method of claim 1, wherein identification of a set of tools by the engine comprises determining if the classification of at least one tool is equal to or more specific than the classification of the indicators of the technologies identified.

4. The method of claim 1, wherein the toolchain template is a pattern for toolchains.

5. A computer program product for modeling toolchains by a computer comprising at least one processor, one or more memories, one or more computer readable storage media, the computer program product comprising a computer readable storage medium having program instructions embodied therewith, in an environment comprising: a toolchain fabric that manages a catalog of a plurality of tool brokers, each tool broker defining an object that represents a specific type of tool;
   provisions and configures tool integrations, each tool integration defining an object that represents a distinct instance of usage of a corresponding tool; and produces toolchains of tool integrations, each toolchain comprising a set of tool integrations and relationships between respective tool integrations, the program instructions executable by the computer to perform a method comprising:
   receiving, by a computer engine, an identification of at least one repository from a user, a set of classifiers, and a catalog of the toolchain fabric comprising known, categorized tool brokers;
   identifying, by the computer engine, indicators of technologies in the at least one repository using at least one selected classifier from the set of classifiers;
   classifying, by the computer engine, using an ontology, contents of the at least one repository according to the indicators of technologies identified;
   analyzing, by the computer engine, the catalog of the plurality of tool brokers, to identify a set of tools;
   generating, by the computer engine, a toolchain model comprising a mapping between the at least one repository and the plurality of tool brokers based upon an intersection of indicated technologies identified in the at least one repository and technologies supported by the set of tools identified, wherein a tool broker in the plurality of tool brokers supports a technology when a classification of the tool broker is equal to or more specific than a classification of a technology;
   updating, by the computer engine, the toolchain model to specify a configuration of tools in number and type for use with the set of repositories, wherein a given tool integration is governed by a tool broker in the plurality of tool brokers, and wherein a subset of the tool integrations represent an original set of repositories or clones thereof; and
   serializing, by the computer engine, the toolchain model into a toolchain template.

6. The computer program product of claim 5, further comprising the program instructions of: generating, by the computer engine, a toolchain using the tools identified by the toolchain template.

7. The computer program product of claim 5, wherein identification of a set of tools by the computer engine comprises determining if the classification of the set of tools is equal to or more specific than the classification of the indicators of the technologies identified.

8. The computer program product of claim 5, wherein the toolchain template is a pattern for toolchains.

9. A computer system for modeling toolchains, in an environment comprising: a toolchain fabric that manages a catalog of a plurality of tool brokers, each tool broker defining an object that represents a specific type of tool; provisions and configures tool integrations, each tool integration defining an object that represents a distinct instance of usage of a corresponding tool; and produces toolchains of tool integrations, each toolchain comprising a set of tool integrations and relationships between respective tool integrations, the computer system comprising a computer comprising at least one processor, one or more memories, one or more computer readable storage media having program instructions executable by the computer to perform the program instructions comprising:
   receiving, by a computer engine, an identification of at least one repository from a user, a set of classifiers, and a catalog of the toolchain fabric comprising known, categorized tool brokers;
   identifying, by the computer engine, indicators of technologies in the at least one repository using at least one selected classifier from the set of classifiers;

classifying, by the computer engine, using an ontology, contents of the at least one repository according to the indicators of technologies identified;

analyzing, by the computer engine, the catalog of the plurality of tool brokers, to identify a set of tools;

generating, by the computer engine, a toolchain model comprising a mapping between the at least one repository and the plurality of tool brokers based upon an intersection of indicated technologies identified in the at least one repository and technologies supported by the set of tools identified, wherein a tool broker in the plurality of tool brokers supports a technology when a classification of the tool broker is equal to or more specific than a classification of a technology;

updating, by the computer engine, the toolchain model to specify a configuration of tools in number and type for use with the set of repositories, wherein a given tool integration is governed by a tool broker in the plurality of tool brokers, and wherein a subset of the tool integrations represent an original set of repositories or clones thereof; and serializing, by the computer engine, the toolchain model into a toolchain template.

10. The computer system of claim 9, further comprising the program instructions of: generating, by the computer engine, a toolchain using the tools identified by the toolchain template.

11. The computer system of claim 9, wherein identification of a set of tools by the engine comprises determining if the classification of the set of tools is equal to or more specific than the classification of the indicators of the technologies identified.

12. The computer system of claim 9, wherein the toolchain template is a pattern for toolchains.

* * * * *